United States Patent
Hemphill et al.

(10) Patent No.: US 9,157,492 B2
(45) Date of Patent: Oct. 13, 2015

(54) FLUID COUPLING LAUNCH DEVICE

(71) Applicants: Jeffrey Hemphill, Copley, OH (US); Todd Sturgin, Wooster, OH (US); Chris Luipold, Wadsworth, OH (US)

(72) Inventors: Jeffrey Hemphill, Copley, OH (US); Todd Sturgin, Wooster, OH (US); Chris Luipold, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 140 days.

(21) Appl. No.: 13/757,502

(22) Filed: Feb. 1, 2013

(65) Prior Publication Data

US 2013/0140122 A1   Jun. 6, 2013

Related U.S. Application Data

(63) Continuation-in-part of application No. 13/039,350, filed on Mar. 3, 2011, now Pat. No. 8,607,948.

(60) Provisional application No. 61/339,520, filed on Mar. 6, 2010.

(51) Int. Cl.
*F16H 45/00* (2006.01)
*F16H 45/02* (2006.01)
*F16D 39/00* (2006.01)
(Continued)

(52) U.S. Cl.
CPC .............. *F16D 39/00* (2013.01); *F16D 21/08* (2013.01); *F16D 33/00* (2013.01); *F16H 45/02* (2013.01); *F16H 2045/002* (2013.01); *F16H 2045/0205* (2013.01); *F16H 2045/0221* (2013.01); *F16H 2045/0257* (2013.01); *F16H 2045/0284* (2013.01)

(58) Field of Classification Search
CPC ................. F16H 2045/005; F16H 2045/0205; F16H 2045/0221; F16H 2045/0257; F16D 21/08
USPC ........................ 192/3.25, 3.26, 48.61, 48.617
See application file for complete search history.

(56) References Cited

U.S. PATENT DOCUMENTS

| 3,088,563 A | 5/1963 | Petrie et al. | |
|---|---|---|---|
| 3,213,983 A * | 10/1965 | Smirl et al. | 192/3.3 |
| 3,365,985 A | 1/1968 | Johnson | |

(Continued)

FOREIGN PATENT DOCUMENTS

| DE | 102008031956 A1 | 2/2009 |
|---|---|---|
| JP | 2005098409 | 4/2005 |

(Continued)

OTHER PUBLICATIONS

International Search Report for PCT/EP2011/001065, mailed Jan. 14, 2013 by European Patent Office.

*Primary Examiner* — Rodney H Bonck
(74) *Attorney, Agent, or Firm* — Kathryn A. Warner (57) ABSTRACT

A launch device for a vehicle transmission includes a housing, an impeller, a turbine; and first and second clutches. The first and second clutches include first and second pistons, respectively. The first and second pistons are sealingly engaged with one another. The first clutch releaseably engages the impeller with the housing and the second clutch releaseably engages the turbine with the first piston. In an example embodiment, the first clutch is disposed radially outside of the second clutch and at least a portion of the first piston is disposed axially between the housing and the second piston. In an example embodiment, the first clutch is engaged by a first pressure, and the second clutch is engaged by a second pressure greater than the first pressure.

15 Claims, 5 Drawing Sheets

(51) Int. Cl.
*F16D 21/08* (2006.01)
*F16D 33/00* (2006.01)

(56) References Cited

U.S. PATENT DOCUMENTS

| | | | | |
|---|---|---|---|---|
| 4,545,264 | A | * | 10/1985 | Hau et al. ................. 475/57 |
| 4,741,422 | A | | 5/1988 | Fuehrer et al. |
| 2004/0188208 | A1 | | 9/2004 | Leber |
| 2007/0287581 | A1 | | 12/2007 | Parks et al. |
| 2008/0078638 | A1 | | 4/2008 | Degler et al. |
| 2008/0156608 | A1 | * | 7/2008 | Kombowski ................. 192/48.1 |
| 2010/0193320 | A1 | * | 8/2010 | Kombowski et al. ....... 192/30 V |
| 2013/0140122 | A1 | | 6/2013 | Hemphill et al. |

FOREIGN PATENT DOCUMENTS

JP 2006521511 9/2006
JP 200813887 6/2008

* cited by examiner

FLUID COUPLING LAUNCH DEVICE

FIELD

The invention relates generally to a launch device, and more specifically to a fluid coupling launch device.

BACKGROUND

Fluid couplings are known. When used in a vehicle driveline, an impeller of the fluid coupling is generally connected to an engine and a turbine of the fluid coupling is generally connected to a transmission. When the vehicle is stopped, the impeller spins with the engine and the turbine does not rotate. Significant engine idle losses may occur when the vehicle is stopped because the fluid coupling is a relatively stiff connection. This means that the engine must use additional power to keep the impeller spinning when the turbine is stationary.

BRIEF SUMMARY

Example aspects broadly comprise a launch device for a vehicle transmission including a housing, an impeller, a turbine; and first and second clutches. The first and second clutches include first and second pistons, respectively. The first and second pistons are sealingly engaged with one another. The first clutch releaseably engages the impeller with the housing and the second clutch releaseably engages the turbine with the first piston. In an example embodiment, the first clutch is disposed radially outside of the second clutch and at least a portion of the first piston is disposed axially between the housing and the second piston. In an example embodiment, the first clutch is engaged by a first pressure, and the second clutch is engaged by a second pressure greater than the first pressure.

In some example embodiments, the launch device includes a release spring disposed axially between the first and second pistons. The release spring urges the second clutch into an open position. In an example embodiment, the launch device includes a bearing or bushing disposed between the release spring and the second piston. In an example embodiment, the first clutch is engaged by a first pressure, and the second clutch is engaged by a second pressure greater than the first pressure.

In an example embodiment, the launch device includes a stator disposed axially between the turbine and the impeller. In an example embodiment, the launch device includes a damper drivingly engaged with the turbine and arranged to transfer torque from the turbine to an input shaft of the vehicle transmission. In an example embodiment, first clutch includes a clutch plate arranged for driving connection to the first piston and the impeller and a preload spring. The preload spring is compressed against the first piston by a fastener and arranged to be further compressed when acted upon by the second piston.

In some example embodiments, the launch device includes a fluid chamber at least partially formed by the first and second pistons. Fluid pressure in the fluid chamber causes displacement of the first and second pistons to close the first and second clutches. In an example embodiment, the first clutch is closeable by a first pressure in the fluid chamber, the first pressure is insufficient to close the second clutch, and the second clutch is closeable by a second pressure, greater than the first pressure, in the fluid chamber.

Other example aspects broadly comprise a launch device for a vehicle transmission including a housing, an impeller, a turbine, first and second clutches, and a spring. The first clutch includes a first piston and is arranged to engage the impeller with the housing. The second clutch includes a second piston and is arranged to engage the turbine with the first piston. The first piston includes a portion radially outward of the second piston and is sealed with respect to the second piston. The second piston includes a portion radially inward of the first piston. The spring urges the second clutch to an open position.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
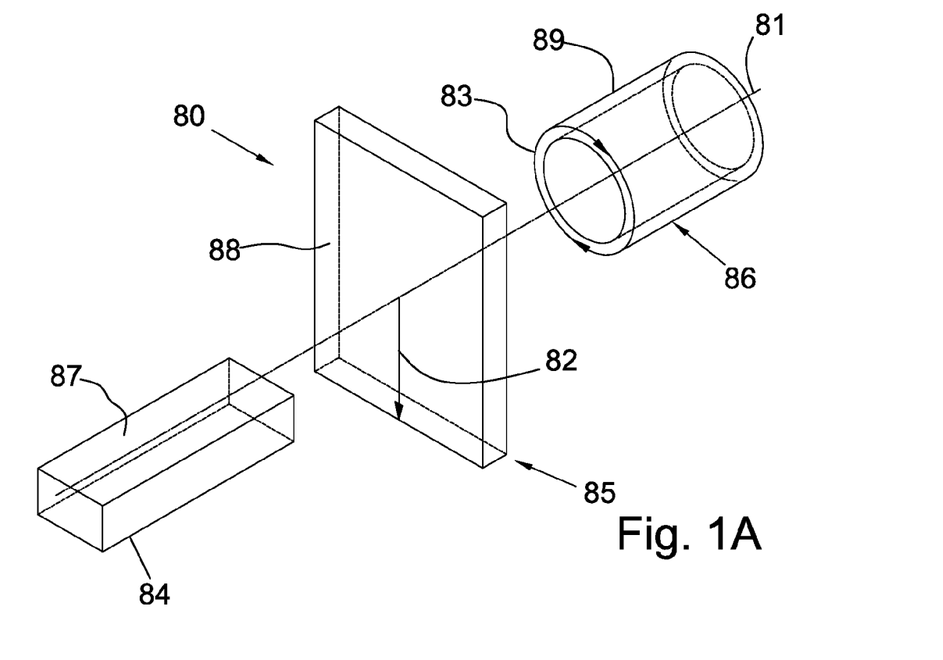
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
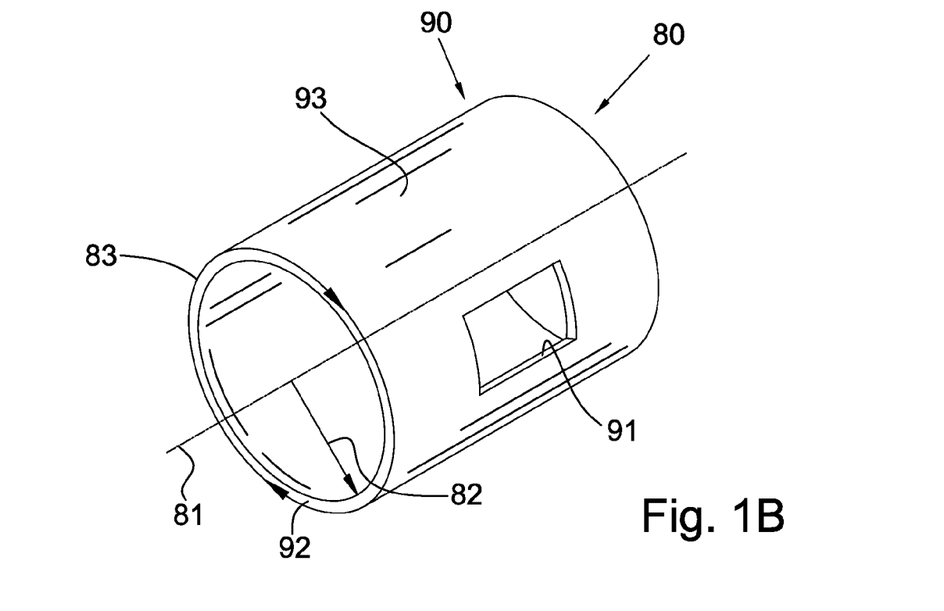
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
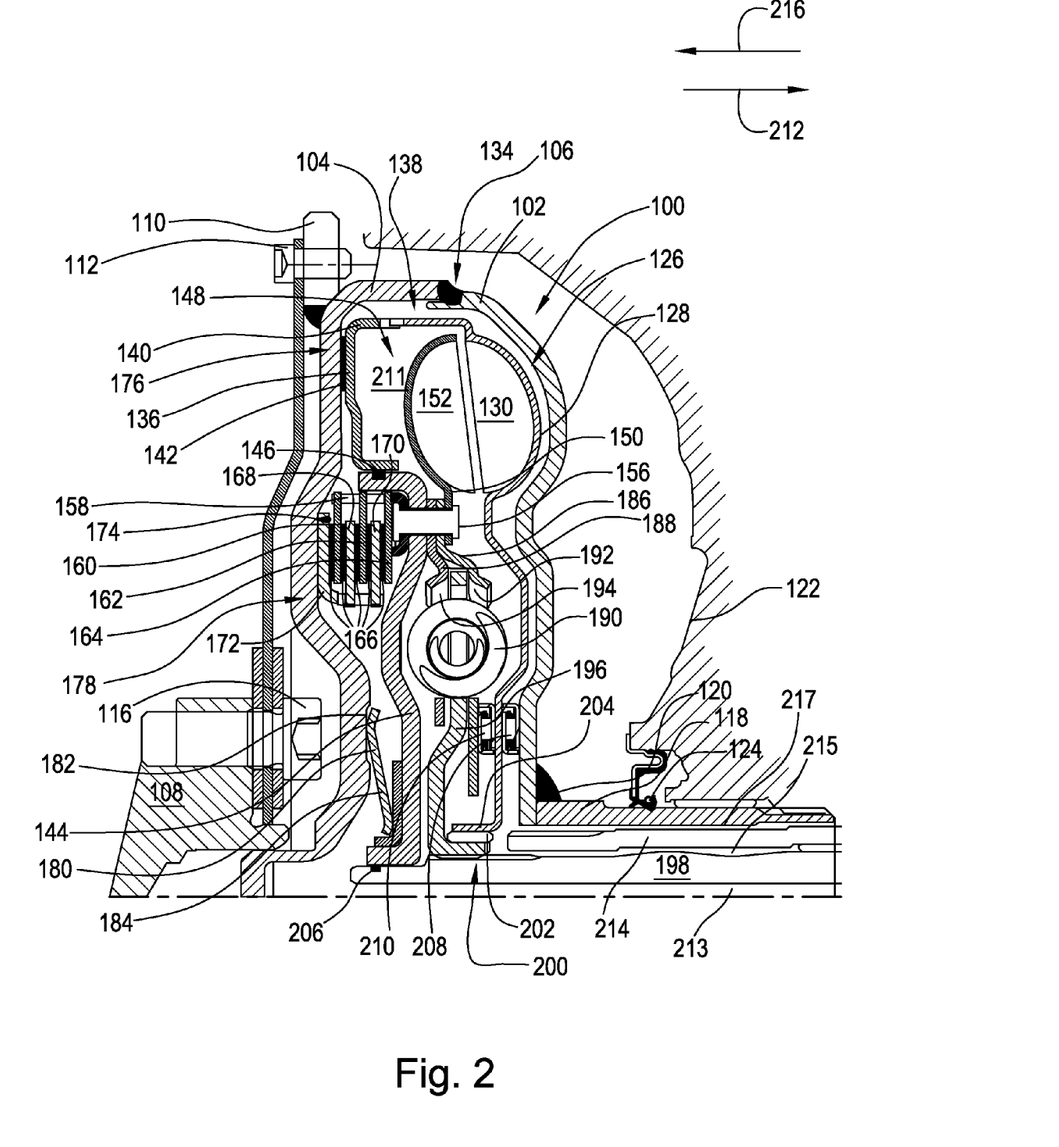
FIG. 2 is a cross section view of an example fluid coupling launch device.

The following description is made with reference to FIG. 2. FIG. 2 is a cross section view of fluid coupling launch device 100. Device 100 includes shells 102 and 104 connected at weld area 106. Shell 104 is drivingly engaged with engine crankshaft 108 through lug 110, bolt 112, flexplate 114, and crankshaft bolt 116. Although shell 104 is attached to flexplate 114 by lug 110 and bolt 112, other methods of attachment may be used. For example, shell 104 may include a stud (not shown) and/or drive plate (not shown) for attachment with flexplate 114.

Shell 102 includes hub 118 attached at weld area 120. Hub 118 is sealingly engaged with transmission case 122 at seal 124. Hub 118 may be drivingly engaged with a transmission pump (not shown), for example.

Impeller 126 includes shell 128 and blades 130. Blades 130 may be attached to shell 128 with tabs (not shown), indents (not shown), welding, and/or brazing. Shell 128 includes axial extension 134 engaged with outer piston 136 at connection 138. Connection 138 can be any connection known in the art that is rotationally fixed and axially movable. For example, connection 138 can be a spline connection or a tab connection where interlocking tabs of shell extension 134 are engaged with tabs of outer piston extension 140. Connection 138 may be a leaf spring connection as is commonly known in the art.

Outer piston 136 includes friction material 142 for engagement with housing shell 104. Outer piston 136 is sealingly engaged with inner piston 144 at seal 146. Seal 146 may be any dynamic seal known in the art. For example, seal 146 may be a square cut teflon seal.

Launch device 100 also includes turbine 148 with shell 150 and blades 152. Shell 150 and blades 152 are attached in a manner similar to the attachment of shell 128 and blades 130 described supra. Shell 150 is fixedly connected to piston 144 at rivet 156, for example.

Piston 144 is fixedly connected to clutch carrier 158 at rivet 156, for example. Carrier 158 is drivingly engaged with friction plates 160, 162, and 164. Plates 160, 162, and 164 include respective friction material rings 166. Spacer plates 168 and 170 are disposed between respective pairs of friction plates, and are drivingly engaged with drive plate 172. For example, spacer plates 168 and 170, and drive plate 172 may include respective tabs in driving engagement. Plate 172 is fixedly attached to housing 104 at weld 174, for example. Weld 174 may be a laser weld, for example. Other methods of drivingly engaging plates 168 and 170, and housing 104 may be employed. For example, plates 168 and 170 may be attached to housing 104 using leaf springs (not shown).

Piston 136, friction material 142 and housing 104 comprise outer clutch assembly 176. Piston 144, plates 160, 162, and 164, friction material rings 166, and spacer plates 168 and 170 comprise inner clutch assembly 178. Release spring 180 is disposed between piston 144 and housing 104. Housing 104 may include anti-rotation slot 182 to prevent rotation of spring 180 relative to housing 104. That is, spring 180 is disposed in slot 182 to prevent wear of the harder spring 180 into the softer housing 104. Piston 144 may include wear plate 184 to prevent wear of spring 180 into piston 144 due to rotational speed difference between spring 180 rotating with housing 104 and piston 144 rotating with turbine 148.

Cover plates 186 and 188 are fixedly connected to piston 144 and turbine 148 by rivet 156, for example. Plates 186 and 188 are drivingly engaged with spring 190. Wings 192 and 194 prevent axial displacement of spring 190. Spring 190 is drivingly engaged with flange 196 which is, in turn, drivingly engaged with input shaft 198 through spline connection 200. Flange 196 centers impeller shell 128 through bushing 202 and impeller shell axial extension 204. Piston 144 is sealed to input shaft 198 with seal 206. Bearings 208 and 210 are radially positioned by respective axial extensions of shell 128 and cover plate 186. Bearings 208 and 210 axially position shell 128 and cover plate 186. Fluid chamber 211 is partially formed by pistons 136 and 144.

Operation of launch device 100 will now be described. Torque received from engine crankshaft 108 is transmitted to housing 104. During a vehicle stop condition, oil pressure is introduced through center hole 213 of input shaft 198. This release pressure urges pistons 136 and 144 in direction of arrow 212 to disengages clutches 176 and 178. The disengaged clutches advantageously reduce the engine power required to maintain idle speed because impeller 126 does not rotate. Impeller 126 only receives torque when outer clutch 176 is engaged.

During a vehicle launch condition, apply pressure is introduced to chamber 211 through channel 215 disposed radially between input shaft 198 and tubular stator shaft 214 and/or channel 217 disposed radially between stator shaft 214 and tubular impeller hub 118. In an example embodiment of the invention (not shown), stator shaft 214 is not present and pressure is introduced in a channel (not shown) disposed radially between input shaft 198 and tubular impeller hub 118.

Apply pressure in chamber 211 urges pistons 136 and 144 in direction of arrow 216. Spring 180 urges piston 144 in direction of arrow 212. During launch, apply pressure is controlled so that force acting on outer piston 136 is sufficient to engage outer clutch 176 to rotate impeller 126. Launch pressure acting on inner piston 144 is not sufficient to overcome force of spring 180, so inner clutch 178 remains disengaged. Cooling flow passes through grooves (not shown) in friction material 142 and/or through an orifice (not shown) in outer piston 136 and/or inner piston 144.

Impeller 126 directs fluid into turbine 148. Reaction torque from the turbine is transmitted to cover plates 186 and 188, through spring 190 and flange 196 to transmission input shaft 198 as described supra to propel the vehicle. After initial launch, apply pressure is increased so that the force acting on piston 144 is sufficient to overcome force of spring 180 to engage clutch 178. Engagement of clutch 178 bypasses the fluid circuit so that torque is transmitted from housing 104 to piston 144, cover plates 186 and 188, through spring 190 and flange 196 to transmission input shaft 198 as described supra. Damper spring 190 advantageously isolates engine vibrations, transmitted into clutch 178, from input shaft 198.

Although clutches 176 and 178 are shown with particular numbers of plates and friction material rings, the clutches may include other numbers of plates and rings. Generally, inner clutch 178 will include more plates and rings than outer clutch 176 because force acting on inner piston 144 must overcome release spring 180. That is, release spring 180 reduces force acting on piston 144 so less force is available to engage clutch 178. Additional clutch plates increase clutch capacity to compensate for lower force.

In an example embodiment of the invention, torque capacity of the fluid circuit formed by impeller 126 and turbine 148 is less than the torque transmitted by the engine into crankshaft 108. Therefore, clutches 176 and 178 must be used in conjunction during a high torque launch event to prevent the engine from running away. Torque transmitted through the fluid circuit advantageously improves friction performance over a typical launch clutch. During low torque launch events (i.e., during a slow speed "creep" in a parking lot), the fluid circuit advantageously provides smooth torque transmission from the engine to the transmission.

Figure 3:
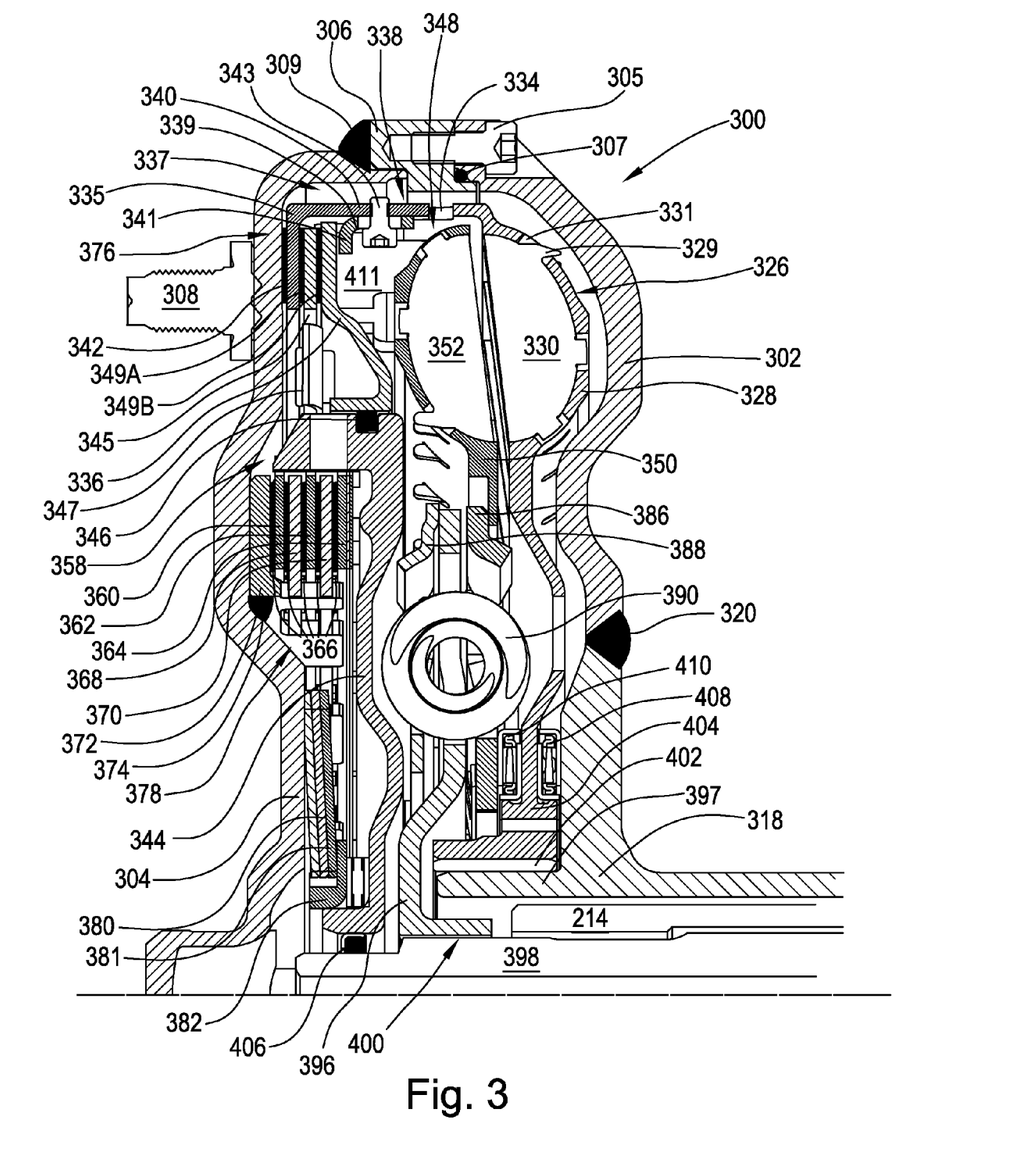
FIG. 3 is a cross section view of an example fluid coupling launch device.

The following description is made with reference to FIG. 3. FIG. 3 is a cross section view of fluid coupling launch device 300. Device 300 includes shells 302 and 304 connected by connector ring 306. Ring 306 is fixed to shell 302 by bolt 305 and sealed to shell 302 by seal 307. In some example embodiments, seal 307 is an o-ring seal. Ring 306 is fixed to shell 304 by weld 309.

Shell 304 is drivingly engaged with an engine crankshaft (not shown) by stud 308 fixed to shell 304 by projection welding, for example. Shell 302 includes hub 318 attached at weld area 320. Hub 318 is sealingly engaged with a transmission case (not shown) and may be drivingly engaged with a transmission pump (not shown), for example.

Impeller 326 includes shell 328 and blades 330. Blades 330 may be attached to shell 328 with tabs 329 engaged with slots 331 disposed in shell 328. In example embodiments, blades 330 may be attached to shell 328 by welding, and/or brazing. Shell 328 includes axial extension 334 engaged with clutch plate 335 at connection 338. Connection 338 can be any connection known in the art that is rotationally fixed and axially movable. For example, connection 338 can be a spline connection or a tab connection where interlocking tabs of shell extension 334 are engaged with tabs of clutch plate extension 340.

Clutch plate 335 is engaged with piston 336 at connection 337. Plate 335 includes blocking plate 339 with radial wall 341. Plate 339 is fixed to extension 340 by bolts 343. Axial position of plate 339 is adjusted to limit the lift-off distance between piston 336 and clutch plate 335. Clutch plate 345 is drivingly engaged with cover 304 through leaf spring 347, for example.

Plate 335 includes friction material 342 for engagement with housing shell 304. Clutch plate 345 includes friction material 349A and 349B for respective engagement with clutch plate 335 and piston 336. Outer piston 336 is sealingly engaged with inner piston 344 at seal 346. Seal 346 may be any dynamic seal known in the art. For example, seal 346 may be a square cut teflon seal.

Launch device 300 also includes turbine 348 with shell 350 and blades 352. Shell 350 and blades 352 are attached in a manner similar to the attachment of shell 328 and blades 330 described supra. Shell 350 is fixedly connected to piston 344 by a bolt, for example (not shown.)

Piston 344 includes clutch carrier portion 358. Carrier 358 is drivingly engaged with friction plates 360, 362, and 364. Plates 360, 362, and 364 include respective friction material rings 366. Spacer plates 368 and 370 are disposed between respective pairs of friction plates, and are drivingly engaged with drive plate 372. For example, spacer plates 368 and 370, and drive plate 372 may include respective tabs in driving engagement. Plate 372 is fixedly attached to housing 304 at weld 374, for example. Weld 374 may be a MIG weld, for example.

Piston 336, clutch plates 335 and 345, friction material 342, 349A and 349B, and housing 304 comprise outer clutch assembly 376. Piston 344, plates 360, 362, and 364, friction material rings 366, and spacer plates 368 and 370 comprise inner clutch assembly 378. Release springs 380 and 381 are disposed between piston 344 and housing 304. Piston 344 may include bushing 382 with an anti-rotation slot to prevent rotation of springs 380 and 381 relative to bushing 382. That is, springs 380 and 382 are disposed in the bushing slot to prevent wear of the harder springs into the softer bushing. Bushing 382 is used to prevent wear of springs 380 and 382 into piston 344 due to rotational speed difference between the springs and the piston.

Cover plates 386 and 388 are fixedly connected to piston 344 and turbine 348 by a bolt (not shown), for example. Plates 386 and 388 are drivingly engaged with spring 390. Wings 392 and 394 prevent axial displacement of spring 390. Spring 390 is drivingly engaged with flange 396 which is, in turn, drivingly engaged with input shaft 398 through spline connection 400. Flange 397 of hub 318 centers impeller shell 328 through bushing 402 and impeller shell axial extension 404. Piston 344 is sealed to input shaft 398 with seal 406. Bearings 408 and 410 are radially positioned by axial extension 404. Bearings 408 and 410 axially position shell 328 and cover plate 386. Fluid chamber 411 is partially formed by pistons 336 and 344.

Operation of launch device 300 is similar to operation of launch device 100 described above and will not be repeated. Although specific applications of launch devices 100 and 300 are shown, other applications may exist and should be considered within the scope of the invention. For example device 100 or 300 may be a torque converter and include a stator (not shown) selectively fixed to stator shaft 214 via a one-way clutch (not shown). It should also be noted that impellers 126 and 326, and turbines 152 and 352 may be designed with a smaller torus than usual due to the way in which devices 100 and 300 are operated. Smaller components advantageously reduces weight and inertia for improved performance.

Figure 4:
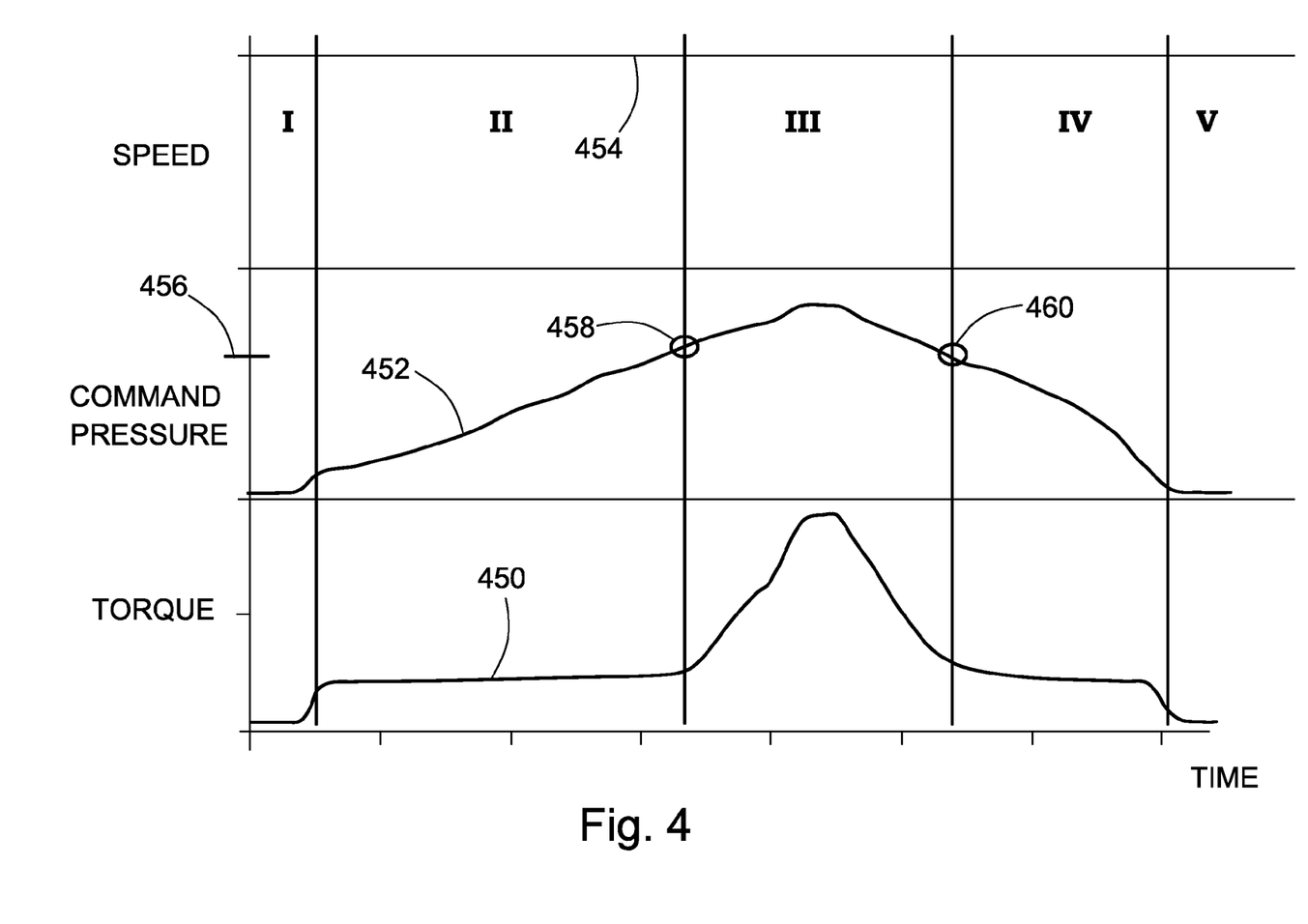
FIG. 4 is a measurement showing operation of a fluid coupling launch device at various engagement states; and, FIG. 5 is a cross section view of an example fluid coupling launch device.

The following description is made with reference to FIG. 4. FIG. 4 is a test measurement showing operation of fluid coupling launch device 300 in response to a command pressure ramp. Line 450 is a plot of torque output by the launch device over time. Line 452 is a plot of hydraulic apply pressure acting on pistons 336 and 344 to engage clutches 376 and 378 over time. Line 454 is a plot of input speed, that is, the speed at which cover 304 is rotated, over time. Input speed is held at a constant value throughout the test. Transmission input shaft 398 is held so that it does not rotate so that output speed is held at zero during the test. Therefore, the speed differential between the input and output is constant. Time is divided into several segments labeled I, II, III, IV, and V. The segments may be described as:

I Idle disconnect;
II Vehicle creep;
III Engagement;
IV Vehicle creep;
V Idle disconnect.

In segment I, torque and pressure start near zero. Segment I is a disconnect mode with low torque for when the vehicle is at a stop light and the brake pedal is depressed, for example. Pressure is increased a small amount (i.e., 1 bar) as the device enters segment II. The small pressure is sufficient to fully engage clutch 376 to transmit low torque, connecting impeller 326 to the vehicle engine so that torque is output to transmission input shaft 398 through turbine 348 to flange 406. As described above, a smaller torus is sufficient since transmitted torque is generally low during vehicle creep mode. Pressure is increased throughout segment II until pressure threshold value 456 (i.e., 3 bar) is achieved, entering segment III.

Throughout segment II, springs 380 and 381 resist axial displacement of piston 344 and engagement of clutch 376. That is, a preload force from springs 380 and 381 acting on piston 344 is greater than a pressure force urging the piston towards cover 304. Output torque is limited to the torque transmitted by the fluid coupling comprised of impeller 326 and turbine 348 due to the difference between the input and output speeds. It should be noted that, during a typical vehicle launch, input and output speeds would vary so that transmitted torus torque would not be constant.

As the command pressure approaches the threshold value, indicated by point 458, inner piston 344 begins to engage clutch 378 as indicated by increasing torque in line 450. Otherwise stated, the force from the command pressure acting on piston 344 exceeds the preload force from springs 380 and 381, urging the piston towards cover 304. The torque in segment III is therefore a combination of the torus torque and the torque from clutch 378. As described above, the input and output speeds are held constant, but, during a typical vehicle launch, input and output speeds would approach one another as clutch 378 engages so that the amount of torque transmitted by the torus goes to zero as the clutch torque approaches the engine torque.

Pressure is reduced in the second half of segment III until command pressure drops below threshold value 456 and clutch 378 is fully disengaged at the transition to segment IV (indicated by point 460). Pressure is further reduced throughout segment IV until clutch 376 is fully disengaged and the device enters disconnect mode in segment V. It should be noted that this is only an example test and that device 300 may have other characteristics under different test conditions. For example, rate of increase or decrease of torque, torque transmitted in disconnect mode, or threshold pressure may vary based on the particular configuration of device 300 or speed or pressure inputs during its operation.

Figure 5:
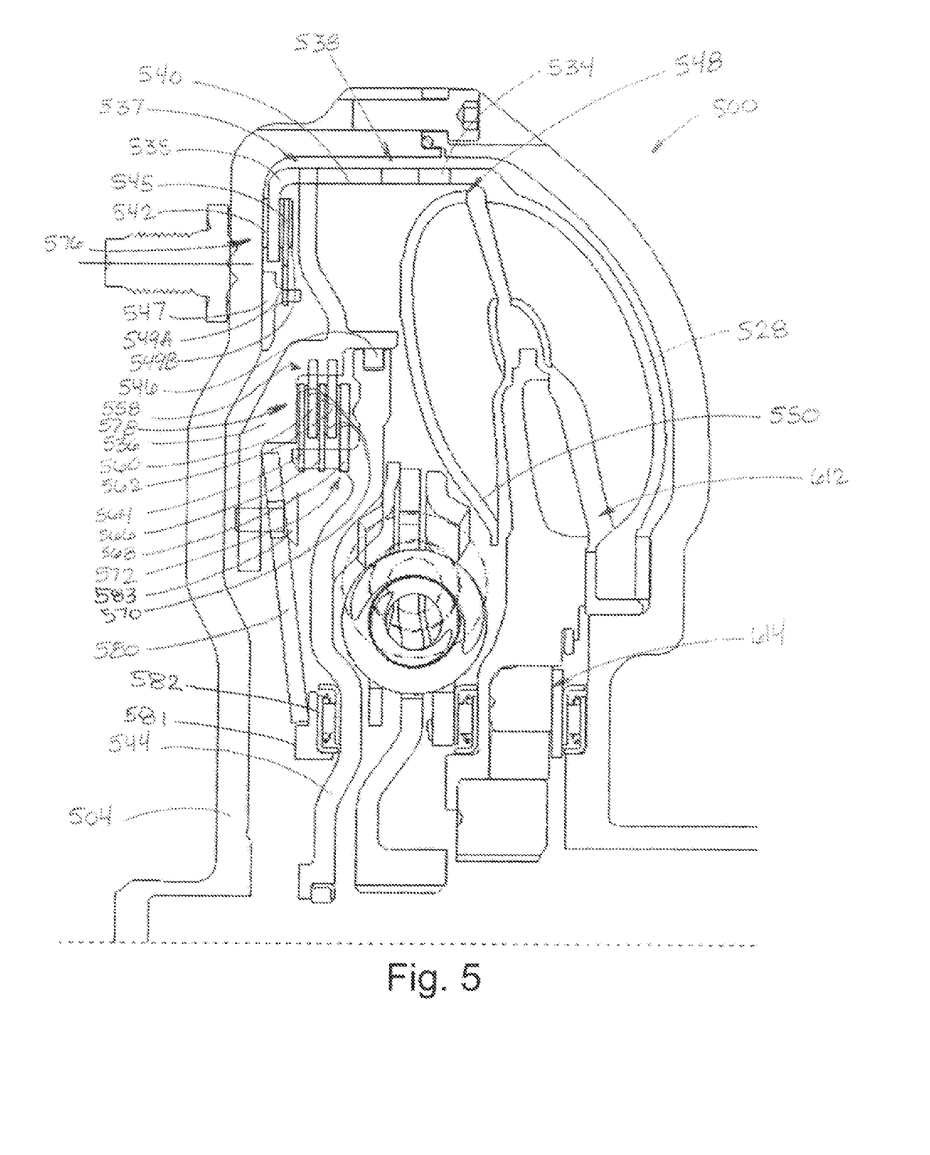

The following description is made with reference to FIG. 5. FIG. 5 is a cross section view of torque converter launch device 500. Device 500 is similar to device 300 except as described below. Impeller shell 528 includes axial extension 534 engaged with clutch plate 535 at connection 538. Connection 538 can be any connection known in the art that is rotationally fixed and axially movable. For example, connection 538 can be a spline connection or a tab connection where interlocking tabs of shell extension 534 are engaged with tabs of clutch plate extension 540. Clutch plate 535 is engaged with piston 536 at connection 537. Clutch plate 545 is drivingly engaged with cover 504 through drive ring 547, for example.

Plate 535 includes friction material 542 for engagement with housing shell 504. Clutch plate 545 includes friction material 549A and 549B for respective engagement with clutch plate 535 and piston 536. Outer piston 536 is sealingly engaged with inner piston 544 at seal 546. Seal 546 may be any dynamic seal known in the art. For example, seal 546 may be a square cut teflon seal.

Launch device 500 also includes turbine 548 with shell 550. Shell 550 is fixedly connected to piston 544 by a bolt, for example (not shown). Launch device 500 includes stator assembly 612 with one-way clutch assembly 614. Piston 536 includes clutch carrier portion 558. Carrier 558 is drivingly engaged with spacer plates 560 and 562. Piston 544 includes drive portion 572 engaged with clutch plates 564, 566, and 568. Plates 564, 566, and 568 include respective friction material rings 570.

Piston 536, clutch plates 535 and 545, friction material 542, 549A and 549B, and housing 504 comprise outer clutch assembly 576. Piston 544, spacer plates 560 and 562, clutch plates 564, 566, and 568, friction material rings 570, and piston 536 comprise inner clutch assembly 578. Release spring 580 is disposed between pistons 536 and 544. Piston 544 may include bearing 582 with spring positioning plate 581. Bearing 582 is used to prevent wear of spring 580 into piston 544 due to rotational speed difference between the springs and the piston. Fastener 583 is engaged with piston 536 to prevent rotation of spring 580 relative to piston 536 and to preload spring 580. That is, by tightening the fastener against the spring, the spring is pre-compressed so that piston 544 does not compress the spring (and start engagement of clutch 578) until the preload force is overcome.

Operation of launch device 500 is similar to operation of launch device 100 described above and will not be repeated. Device 500 includes an advantageous clutch configuration with reduced drag when the clutches are disengaged. Since plates 560 and 562 of clutch 578 are engaged with piston 536 (instead of the housing as in device 300), there is no relative rotation in that clutch when the vehicle is stopped. That is, during a vehicle idle-stop condition, housing 504 is rotating but pistons 536 and 544 are not. Therefore, there is drag-inducing slip in clutch 576 but not clutch 578. Furthermore, because preload spring acts between piston 544 and piston 536 instead of the housing, a pressure force applied to piston 544 also acts to engage piston 536 and clutch 576, effectively increasing clutch gain so that clutch 576 requires fewer clutch plates to carry a same amount of torque when compared with clutch 378 in device 300, for example. That is, the force to engage clutch 576 is the total pressure force applied to pistons 536 and 544, not the force applied to piston 536 only, as in device 300.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A launch device for a vehicle transmission comprising:
   a housing
   an impeller;
   a turbine;
   first and second clutches comprising first and second pistons, respectively, the first and second pistons sealingly engaged with one another; and,
   a release spring disposed axially between the first and second pistons, wherein:
   the first clutch releaseably engages the impeller with the housing;
   the second clutch releaseably engages the turbine with the first piston; and,
   the release spring urges the second clutch into an open position.

2. The launch device of claim 1, wherein:
   the first clutch is disposed radially outside of the second clutch; and,
   at least a portion of the first piston is disposed axially between the housing and the second piston.

3. The launch device of claim 1, wherein the first clutch is engaged by a first pressure, and the second clutch is engaged by a second pressure greater than the first pressure.

4. The launch device of claim 1, further comprising a bearing or bushing disposed between the release spring and the second piston.

5. The launch device of claim 1 further comprising a stator disposed axially between the turbine and the impeller.

6. The launch device of claim 1, further comprising a damper drivingly engaged with the turbine and arranged to transfer torque from the turbine to an input shaft of the vehicle transmission.

7. The launch device of claim 1, wherein the first clutch comprises:
- a clutch plate arranged for driving connection to the first piston and the impeller
- wherein the release spring is compressed against the first piston by a fastener and arranged to be further compressed when acted upon by the second piston.

8. The launch device of claim 1, further comprising a fluid chamber at least partially formed by the first and second pistons, wherein fluid pressure in the fluid chamber causes displacement of the first and second pistons to close the first and second clutches.

9. The launch device of claim 8 wherein:
- the first clutch is closeable by a first pressure in the fluid chamber;
- the first pressure is insufficient to close the second clutch; and,
- the second clutch is closeable by a second pressure, greater than the first pressure, in the fluid chamber.

10. A launch device for a vehicle transmission comprising:
- a housing
- an impeller;
- a turbine;
- a first clutch comprising a first piston having a carrier portion;
- a second clutch comprising:
- a second piston; and,
- first and second spacer plates; and
- a release spring disposed axially between the first and second pistons;
- wherein the carrier portion is drivingly engaged with the first and second spacer plates.

11. The launch device of claim 10 further comprising a seal, wherein the first piston is sealingly engaged with the second piston.

12. The launch device of claim 10 wherein the first piston includes a portion radially outward of the second piston.

13. The launch device of claim 10, wherein the second clutch is arranged to engage the turbine with the first piston.

14. The launch device of claim 10, wherein:
- the first clutch releaseably engages the impeller with the housing;
- the second clutch releaseably engages the turbine with the first piston; and,
- the release spring urges the second clutch into an open position.

15. The launch device of claim 10 further comprising a stator.

* * * * *